United States Patent
Ehrling et al.

(10) Patent No.: US 11,435,329 B2
(45) Date of Patent: Sep. 6, 2022

(54) REACTION TUBE FOR ELEMENTAL ANALYSIS

(71) Applicant: Analytik Jena AG, Jena (DE)

(72) Inventors: Christiane Ehrling, Ilmenau (DE); Robert Knöfel, Ilmeanu (DE)

(73) Assignee: Analytik Jena AG, Jena (DE)

(*) Notice: Subject to any disclaimer, the term of this patent is extended or adjusted under 35 U.S.C. 154(b) by 289 days.

(21) Appl. No.: 16/903,619

(22) Filed: Jun. 17, 2020

(65) Prior Publication Data
US 2020/0400627 A1 Dec. 24, 2020

(30) Foreign Application Priority Data
Jun. 18, 2019 (DE) .................. 10 2019 116 547.4

(51) Int. Cl.
*G01N 31/12* (2006.01)

(52) U.S. Cl.
CPC .................. *G01N 31/12* (2013.01)

(58) Field of Classification Search
CPC ........................................ G01N 31/12
USPC ........................................ 422/80
See application file for complete search history.

(56) References Cited

U.S. PATENT DOCUMENTS

| | | | | |
|---|---|---|---|---|
| 3,296,435 A * | 1/1967 | Teal | ........ | G01N 31/12 436/160 |
| 3,776,695 A * | 12/1973 | Peterson | ........ | G01N 31/12 250/361 R |
| 4,070,155 A * | 1/1978 | Fraim | ........ | G01N 31/005 436/114 |
| 4,244,917 A * | 1/1981 | Woods | ........ | G01N 31/12 432/198 |
| 4,409,336 A * | 10/1983 | Oita | ........ | G01N 31/12 205/785.5 |
| 4,499,191 A | 2/1985 | Bruening et al. | | |
| 4,914,037 A * | 4/1990 | Forster | ........ | G01N 31/12 261/78.2 |
| 5,064,617 A * | 11/1991 | O'Brien | ........ | G01N 31/12 432/198 |

(Continued)

FOREIGN PATENT DOCUMENTS

| CN | 2539167 Y | 3/2003 |
|---|---|---|
| CN | 104678047 A | 6/2015 |

(Continued)

*Primary Examiner* — Arlen Soderquist
(74) *Attorney, Agent, or Firm* — Christopher R. Powers; Endress+Hauser (USA) Holding Inc.

(57) ABSTRACT

The present disclosure relates to a combustion tube for a device for elemental analysis of a sample, comprising an outer tube including an outlet and an inner tube including an inlet, the inner tube detachably insertable into the outer tube, wherein the outer and inner tubes are arranged such that the sample passes through the inlet, through the inner tube into the outer tube, and out of the combustion tube through the outlet, wherein the inner and outer tubes are configured such that, at least in a region in which the inner tube is surrounded by the outer tube, the sample is essentially inside the inner tube. The outer tube is made of a quartz glass, and the inner tube is made of a ceramic. The present invention further relates to a device for elemental analysis of a sample comprising a combustion tube according to the present disclosure.

16 Claims, 3 Drawing Sheets

(56) References Cited

U.S. PATENT DOCUMENTS

| | | | |
|---|---|---|---|
| 5,204,071 A * | 4/1993 | Carter | C01B 32/963 |
| | | | 423/442 |
| 5,236,353 A | 8/1993 | Adani et al. | |
| 6,458,328 B1 * | 10/2002 | Wreyford | G01N 31/12 |
| | | | 422/89 |
| 2003/0032194 A1 * | 2/2003 | Wreyford | G01N 31/12 |
| | | | 422/78 |
| 2004/0126729 A1 | 7/2004 | Hayashi | |
| 2005/0153253 A1 * | 7/2005 | Olstowski | F23M 9/06 |
| | | | 431/76 |
| 2006/0053874 A1 * | 3/2006 | Bauman | G01N 33/1846 |
| | | | 73/114.75 |

FOREIGN PATENT DOCUMENTS

| | | |
|---|---|---|
| CN | 106323730 A | 1/2017 |
| DE | 3118876 A1 | 12/1982 |
| DE | 4306319 A1 | 9/1993 |
| DE | 4231727 A1 | 3/1994 |

* cited by examiner

REACTION TUBE FOR ELEMENTAL ANALYSIS

CROSS-REFERENCE TO RELATED APPLICATION

The present application is related to and claims the priority benefit of German Patent Application No. 10 2019 116 547.4, filed on Jun. 18, 2019, the entire contents of which are incorporated herein by reference.

TECHNICAL FIELD

The present disclosure relates to a combustion tube for a device for elemental analysis of a sample and to a device for elemental analysis of a sample.

BACKGROUND

Elemental analyzers are often used for determining the proportion of an element, for example, carbon, hydrogen, oxygen, nitrogen, sulfur, chlorine or fluorine, in a solid, liquid or gaseous sample or a measurand, which depends on the concentration of one or more constituents of a sample. Known analysis devices for elemental analysis comprise a combustion tube into which the sample is introduced and thermally decomposed by supply of a reaction gas. For example, organic and inorganic bonded carbon is converted into carbon dioxide, nitrogen into nitrogen dioxide, sulfur into sulfur oxides, chlorine into hydrogen chloride or hydrogen into water. The gas or gas mixture produced in this process is conducted through a drying and absorber unit by a carrier gas flowing through the combustion tube to a measuring device which is used to determine the measurand in question. High-purity oxygen, argon or helium, for example, may be used as the reaction and carrier gas, especially for trace analysis.

The combustion tubes used are typically made of quartz glass. However, with some applications, for example, in the analysis of samples with a high salt content, especially with a high content of alkali metal ions and/or alkaline earth metal ions, this has the disadvantage of leading to rapid devitrification, that is, to the occurrence of crystallization, including the formation of cracks in the quartz glass. In addition, the analysis of fluorine-containing samples leads to significant corrosion of quartz glass by the hydrofluoric acid formed, especially in interaction with alkali metal and/or alkaline earth metal ions. This leads to very low service lives and/or lifetimes of reaction tubes compared to service lives and/or lifetimes of reaction tubes used in the analysis of low-salt samples.

Starting from this problem, the object of the present invention is to provide a robust combustion tube that is also suitable for the analysis of salt-containing samples.

SUMMARY

This object is achieved by the combustion tube according to claim 1 and by the device according to claim 15.

With respect to the combustion tube, the object is achieved by a combustion tube for a device for elemental analysis of a sample, comprising an outer tube having a sample outlet, and an inner tube having an inlet, wherein the inner tube can be inserted into the outer tube in a detachable manner such that the outer tube at least partially surrounds the inner tube, wherein the outer and the inner tube are arranged relative to each other so that the sample passes through the inlet of the inner tube, through the inner tube into the outer tube, and out of the combustion tube through the sample outlet, wherein the inner and outer tube are configured such that, at least in a region in which the inner tube is surrounded by the outer tube, the sample is essentially inside the inner tube, wherein the outer tube is made of a quartz glass and wherein the inner tube is made of a ceramic.

The inlet of the inner tube serves both as a sample inlet and as an inlet for a reaction gas and/or carrier gas. In particular, the reaction and/or carrier gas and the sample can be introduced into the reaction tube through the same inlet. However, two separate inlets would also be possible. The outer tube likewise has a gas connection for introducing a reaction gas, carrier gas and/or flushing gas. The reaction, carrier and/or flushing gas may be, for example, oxygen or argon.

Given that the inner tube is made of ceramic, it is possible and advantageous to significantly increase the service life and/or lifetime of the reaction tube, especially in the analysis of salt-containing samples. The combustion tube is typically heated in the region where the outer tube surrounds the inner tube. Since the sample is essentially only located in the inner tube within this critical region, the outer quartz glass tube is not corroded by the sample. In contrast, the inner ceramic tube is insensitive to alkali metal ions and/or alkaline earth metal ions and hydrofluoric acid and is accordingly not corroded by a sample matrix of this type.

Furthermore, the solution according to the invention advantageously eliminates the need for modifications to the outer tube. Rather, existing geometries can be maintained without any change for the outer tube, so that the combustion tube according to the invention can be used for already existing elemental analyzers. This means there is downward compatibility in the field.

In one embodiment, the ceramic is an aluminum oxide ceramic or a zirconium oxide ceramic.

In another embodiment, the combustion tube includes an inlet element for introducing water into an interior volume of the inner tube, such inlet element being attachable to the inner tube. The inner tube can, for example, be split in the region of the inlet element, wherein the inlet element is arranged in one of the two branches. However, splitting is not absolutely necessary.

With regard to the inlet element, it is also advantageous if the inlet element comprises a cannula, especially of platinum or of a platinum alloy, which can be inserted into the inner tube. When attached to the combustion tube, the cannula then preferably protrudes into the interior volume of the inner tube.

In yet another embodiment, a diameter of the outer tube in the region of the sample outlet is smaller than outside the region of the sample outlet. In particular, the combustion tube narrows in the region of the sample outlet. In this case, the inner tube extends at most up to the sample outlet.

In a particularly preferred embodiment of the combustion tube, when the inner tube has been inserted into the outer tube, the inner tube extends at least from a first end region of the outer tube that faces away from the sample outlet to the sample outlet. The inner tube thus extends continuously as far as the sample outlet of the outer tube. It can also protrude out of the outer tube in a region of the outer tube that faces away from the sample outlet.

In an alternative, particularly preferred embodiment, the combustion tube comprises an intermediate tube which can be inserted into the outer tube and which at least partially surrounds the inner tube when it has been inserted into the outer tube. The inner tube thus protrudes at least partially into the intermediate tube and is at least partially located in the region in which the inner tube is surrounded by the outer tube.

The intermediate tube prevents the corrosion of the outer quartz glass tube during analysis of aggressive, for example salt-containing, samples. The intermediate tube can preferably be inserted into the outer tube in a detachable manner and can be replaced at predeterminable time intervals.

With regard to the intermediate tube, it is advantageous if the intermediate tube is arranged in a region of the outer tube that faces the sample outlet of the outer tube. The sample thus passes from the inner tube through the intermediate tube into the outer tube and out of the combustion tube through the sample outlet.

It is advantageous if the intermediate tube is made of a quartz glass.

It is also advantageous if an interior volume of the intermediate tube is at least partially filled with a sacrificial material, especially quartz chips or quartz wool.

Salt-containing samples thus corrode the intermediate tube and the sacrificial material. The outer tube essentially does not come into contact with the sample and is accordingly not corroded, especially in a region in which the sample is heated. The sample is preferably heated at least partially in the region in which the inner tube is surrounded by the outer tube.

It is further advantageous if an interior volume of the intermediate tube and/or of the inner tube is at least partially filled with a filter material. The filter material is preferably arranged in a region that faces the sample outlet of the outer tube.

It is also advantageous if an interior volume of the intermediate tube is at least partially filled with a catalyst, especially platinum on aluminum oxide or cerium oxide. In this way, the combustion tube according to the invention can also be used for catalyst-assisted sample decomposition.

The object of the invention is further achieved by a device for elemental analysis of a sample, comprising a combustion tube according to at least one of the preceding claims.

The device is preferably a device for analyzing the elements carbon, nitrogen, fluorine, sulfur, chlorine, hydrogen or oxygen.

It should be noted that the embodiments described in connection with the combustion tube according to the invention can also be applied mutatis mutandis to the device according to the invention and vice versa.

BRIEF DESCRIPTION OF THE DRAWINGS

The invention is explained in greater detail with reference to the following figures in which.

DETAILED DESCRIPTION

In the figures, the same elements are indicated by the same reference signs.

Figure 1:
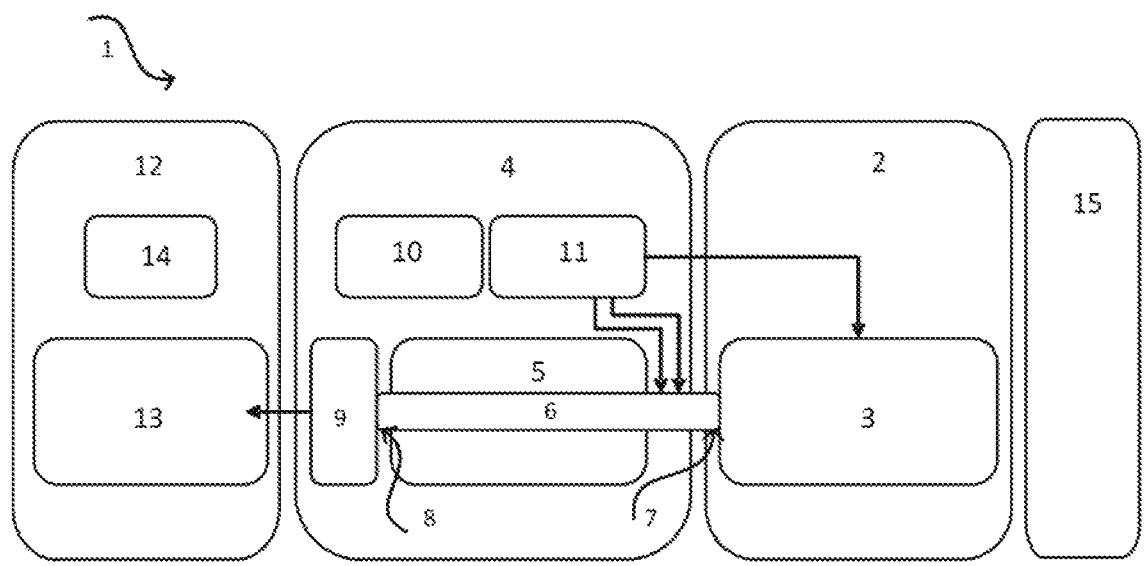
FIG. 1 shows a state-of-the-art elemental analyzer.

FIG. 1 shows a schematic representation of a structure of a state-of-the-art elemental analyzer 1. The elemental analyzer 1 comprises a module for introducing samples 2 having a metering unit 3 having an integrated sample supply and a furnace module 4. The furnace module 4 has a furnace 5 having heating elements, not shown here, and thermal insulation, in which a combustion tube 6. A unit for gas preparation 9 is attached to the furnace 5. The furnace module 4 further comprises a unit for device control 10 and a unit for media management 11.

The combustion tube 6 has an inlet 7 and a sample outlet 8. The inlet 7 serves to supply the sample and to introduce the reaction gas and/or carrier gas used. During continuous operation, the combustion tube 6 is typically heated to internal temperatures between 600° C. and 1300° C.

The unit for gas preparation 9 is connected to a detector module 12, which has a detection unit 13 which is configured appropriately for the particular element to be analyzed and a control unit 14. The elemental analyzer 1 further comprises a superordinated unit 15, for example for evaluating the measurement signal and for controlling individual components of the device 1.

It should be noted that the structure of the elemental analyzer 1 shown here is to be understood only as an example. The present invention is by no means restricted to such elemental analyzers 1, but can be applied to diverse variations of corresponding devices 1 that are known from the prior art.

Figure 2:
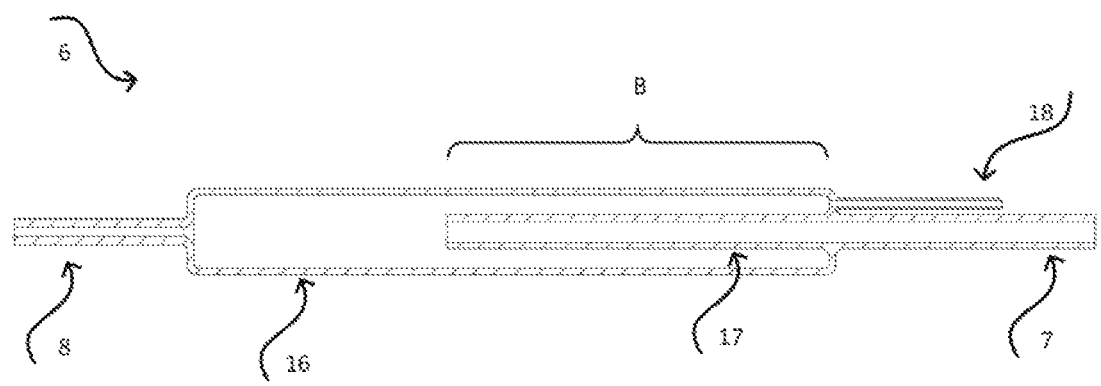
FIG. 2 shows state-of-the-art combustion tube.

A state-of-the-art combustion tube 6 is depicted in more detail in FIG. 2. The combustion tube 6 is made of quartz glass and has an outer tube 16 and an inner tube 17, which is surrounded by the outer tube 16 in the partial region B. In contrast, in the region of the inlet 7, the inner tube 17 protrudes out of the outer tube 16. Gases and/or water can be introduced into the combustion tube 6 via various additional connections 18.

Figure 3A:
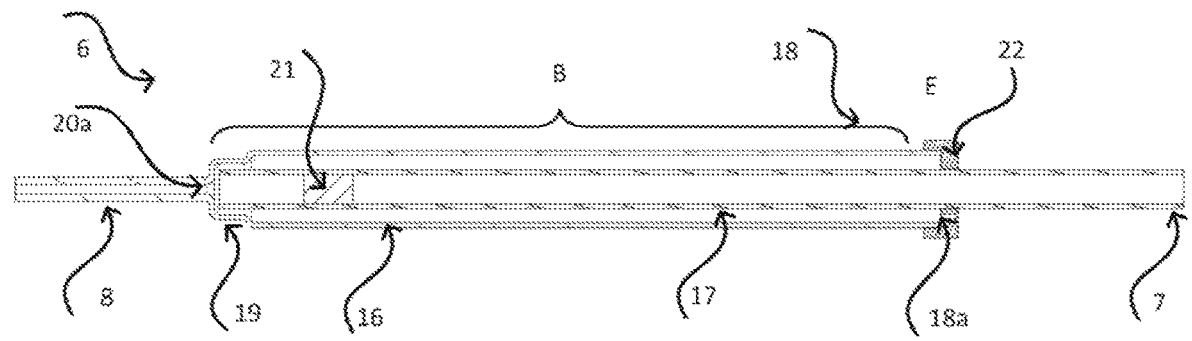
FIGS. 3a and 3b show a combustion tube according to the present disclosure having a continuous inner tube.
Figure 3B:
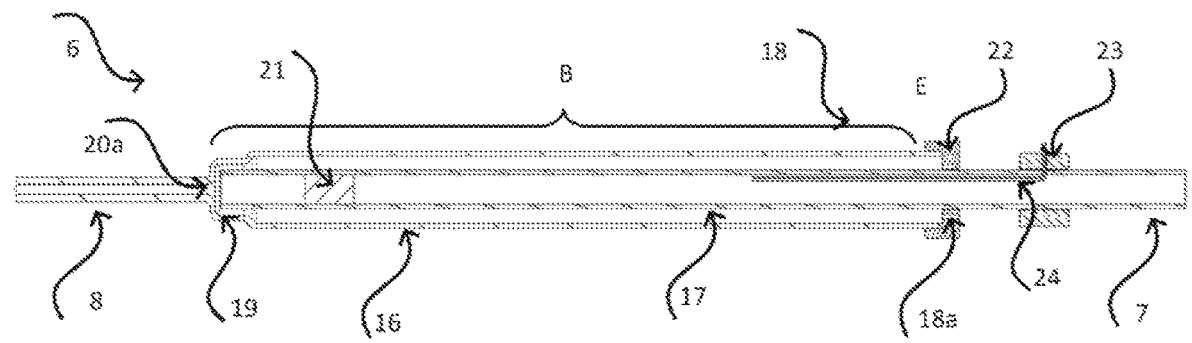

A first possible embodiment of a combustion tube 6 according to the invention is shown in FIGS. 3a and 3b. The combustion tube shown in FIG. 3a has an outer tube 16 of quartz glass having a sample outlet 8, wherein the diameter of the outer tube 16 is reduced or narrowed in the region of the sample outlet 8. An inner tube 17 made of a ceramic, for example an aluminum oxide ceramic, is inserted inside the outer tube; in the embodiment shown here, it runs from the sample outlet 8 of the outer tube 16 to an end region E of the outer tube 16 arranged on the opposite side and protrudes from the outer tube 16 in this end region E. The region B, in which the outer tube 16 surrounds the inner tube 17, thus extends from the sample outlet 8 to the end region E. A connecting element 22 for producing a sealed connection between the inner 17 and outer tube 16 is arranged in the end region E. The connecting element 22 further has a gas connection 18a which can, for example, supply the combustion tube 6 with a flushing gas.

Furthermore, a filter element 21 is inserted into the inner tube 17 in the region of the sample outlet 8. However, such a filter element 21 is not absolutely necessary. There is a gap 19 in the region of the combustion tube 6 that faces the sample outlet 8. In such region, the flushing gas can flow between the inner 17 and the outer tube 16, for example.

In this embodiment of the combustion tube 7, the inlet 7 acts as sample inlet and as an inlet for a reaction gas and/or carrier gas. In a region at location 20 that faces the sample outlet 8, the sample passes from the inner tube 17 into the outer tube 16 and through the sample outlet 8 to the detection module 12. The inner tube 17 may, for example, have a slit in this region.

The embodiment of a combustion tube 6 according to the invention shown in FIG. 3b differs from FIG. 3a by an additional inlet element 23 in the inner tube. The inlet element 23 is for introducing water into an interior volume of the inner tube 17 and includes a cannula 24 protruding into the interior volume of the inner tube 17. The cannula 24 may be made, for example, of platinum or a platinum alloy.

Figure 4A:
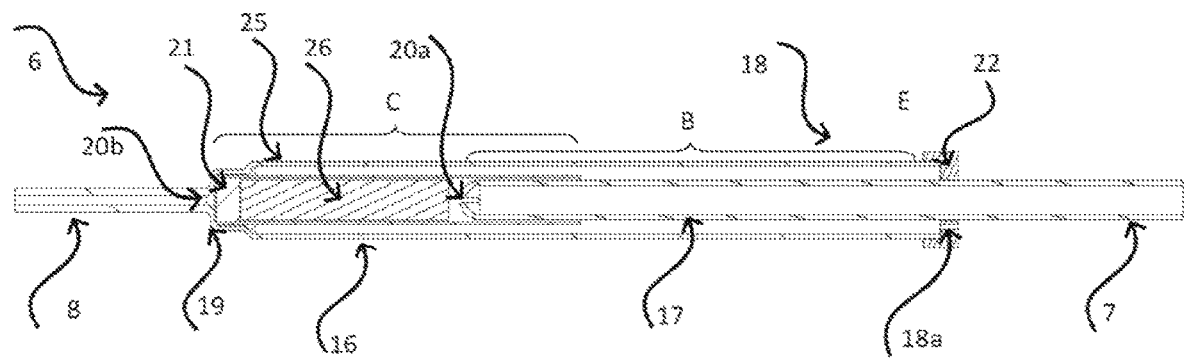
FIGS. 4a and 4b show a combustion tube according to the present disclosure having an intermediate tube.
Figure 4B:
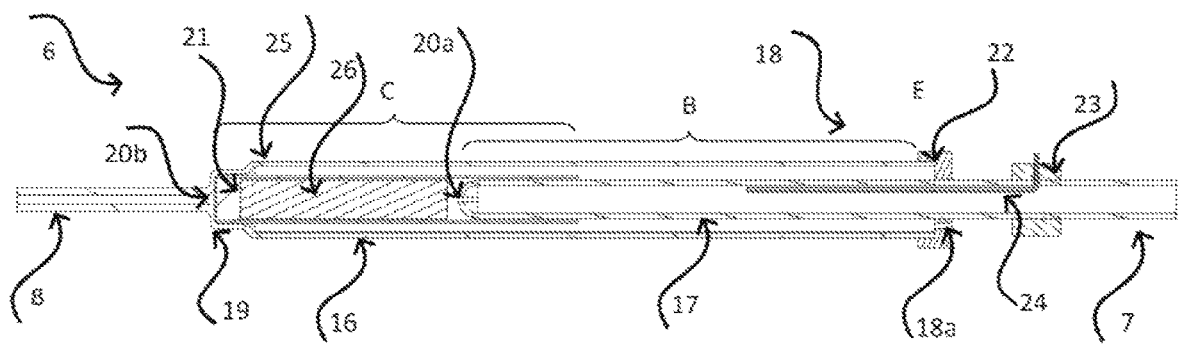

A further preferred embodiment of a combustion tube 6 according to the invention is shown in FIGS. 4a and 4b. Here, the combustion tube 6 additionally comprises an intermediate tube 25, and the inner tube 17 partially protrudes into the intermediate tube 25, but in contrast to the embodiment in FIGS. 3a and 3b does not extend as far as the sample outlet 8.

The intermediate tube 25 is arranged in a region C in the outer tube 16 that faces the sample outlet 8 and is likewise made of quartz glass. In the region that faces the sample outlet 8, a filter material 21, followed by a sacrificial material 26, is arranged in an interior volume of the intermediate tube 25. In this case, the sample passes from the inner tube 17 through the, especially slit-shaped, opening 20a into the intermediate tube 25 and from the intermediate tube 25 through the opening 20b into the outer tube 16 and out of the combustion tube 6 through the sample outlet 8.

The intermediate tube 25 protects the outer tube 16 from wear. This is because the sample and the reaction gas and/or carrier gas pass from the inner tube 17 made of ceramic to the sample outlet via the intermediate tube 25 and therefore practically cannot corrode the outer tube 16.

A catalyst can also be arranged in the intermediate tube 25 instead of a sacrificial material 26. In this case, the combustion tube 6 can also be used for catalyst-assisted sample decomposition.

As in the case of FIG. 3b, the embodiment shown in FIG. 4b is additionally provided with an inlet element 23 for introducing water into the interior volume of the inner tube 17.

In summary, the present invention allows the use of an inner tube 17 made of a ceramic which is advantageously insensitive to salt-containing samples, especially to alkali metals and/or alkaline earth metals. Contact between the sample and/or reaction and/or carrier gas used in each case and the outer tube 16 is effectively prevented. This allows a particularly high service life of the combustion tube 6 to be reached. The outer tube 16 need not be modified for this purpose.

The invention claimed is:

1. A combustion tube for a device adapted for elemental analysis of a sample, the combustion tube comprising:
    an outer tube having a sample outlet; and
    an inner tube having an inlet, wherein the inner tube and the outer tube are:
        configured such that the inner tube is detachably insertable into the outer tube such that the outer tube at least partially surrounds the inner tube;
        arranged relative to each other such that, in operation, the sample passes from the inlet of the inner tube, through the inner tube into the outer tube, through the sample outlet, and out of the combustion tube; and
        configured such that the sample is disposed essentially in the inner tube at least in a region in which the inner tube is surrounded by the outer tube,
    wherein the outer tube is a quartz glass, and wherein the inner tube is a ceramic.

2. The combustion tube of claim 1, wherein the ceramic is an aluminum oxide ceramic or a zirconium oxide ceramic.

3. The combustion tube of claim 1, further comprising an inlet element configured to introduce water into an interior volume of the inner tube, wherein the inlet element is attachable to the inner tube.

4. The combustion tube of claim 3, wherein the inlet element comprises a cannula of platinum or a platinum alloy, which is configured to be inserted into the inner tube.

5. The combustion tube of claim 1, wherein a diameter of the outer tube in a region of the sample outlet is smaller than a diameter of the outer tube outside the region of the sample outlet.

6. The combustion tube of claim 1, wherein, when inserted into the outer tube, the inner tube extends at least from a first end region of the outer tube opposite the sample outlet to the sample outlet.

7. The combustion tube of claim 1, further comprising an intermediate tube configured to be inserted into the outer tube and to at least partially surround the inner tube when inserted into the outer tube.

8. The combustion tube of claim 7, wherein the intermediate tube is disposed in a region of the outer tube adjacent the sample outlet of the outer tube.

9. The combustion tube of claim 7, wherein the intermediate tube is a quartz glass.

10. The combustion tube of claim 7, wherein an interior volume of the intermediate tube is at least partially filled with a sacrificial material including quartz chips or quartz wool.

11. The combustion tube of claim 7, wherein an interior volume of the intermediate tube and/or of the inner tube is at least partially filled with a filter material.

12. The combustion tube of claim 11, wherein the filter material is disposed in a region of the intermediate tube adjacent the sample outlet of the outer tube.

13. The combustion tube of claim 7, wherein an interior volume of the intermediate tube is at least partially filled with a catalyst.

14. The combustion tube of claim 13, wherein the catalyst is platinum on aluminum oxide or cerium oxide.

15. A device for elemental analysis of a sample, the device comprising a combustion tube according to claim 1.

16. The device of claim 15, wherein the device is configured for analyzing the elements carbon, nitrogen, fluorine, sulfur, chlorine, hydrogen or oxygen.

* * * * *